Sept. 14, 1926.

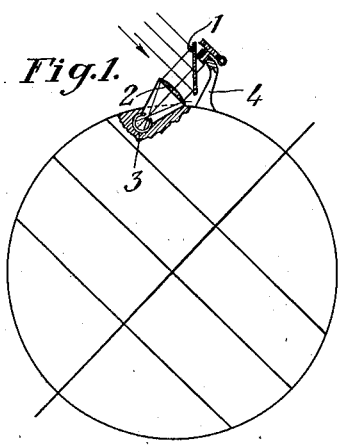
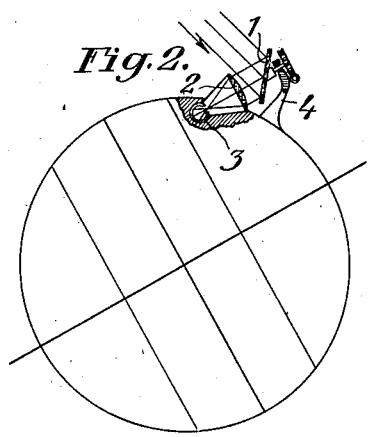
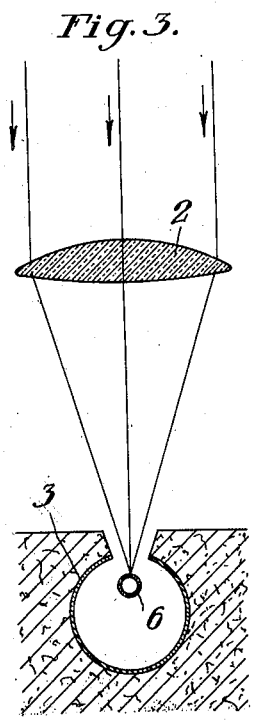
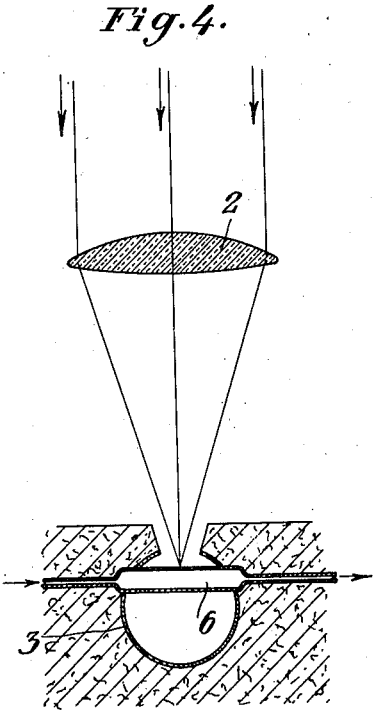

A. MARCUSE

SOLAR HEATER

Filed Sept. 2, 1924

Inventor:
Adolf Marcuse
by [signature]
atty.

Patented Sept. 14, 1926.

1,599,481

UNITED STATES PATENT OFFICE.

ADOLF MARCUSE, OF CHARLOTTENBURG, NEAR BERLIN, GERMANY.

SOLAR HEATER.

Application filed September 2, 1924, Serial No. 735,418, and in Germany June 28, 1924.

My invention relates to a solar heater and its particular object is to provide means whereby the solar heat is better utilized than in similar devices hitherto known in which a fluid traversing a tube or tubes is heated by the heat of the sun rays passing through the metal walls of the tubes by conduction. Apart from this direct action mirrors have already been employed for directing part of the heat rays back into the tubes.

According to the present invention the tubes or the like carrying the fluid are arranged within a substantially spherical mirror, i. e. a hollow body having highly reflecting inner walls capable of concentrating light or heat rays entering it through an aperture in the walls onto a point or points within the space surrounded by these walls. By arranging the tubes or the like traversed by the fluid within such spherical reflector in a position wherein they are exposed not only to the heat rays as they enter through the aperture, but also to the combined action of the heat rays concentrated on them by the spherical reflector I am enabled to utilize the solar heat to a greater extent than was hitherto possible.

The reflectors are preferably surrounded by bad heat conductors such as sand or the like, being preferably sunk in the ground, an optical system serving for concentrating the greatest possible amount of sun rays into the aperture of the reflecting sphere, means being provided whereby this system is caused to follow the movements of the sun so as to continuously concentrate the rays into the aperture.

In the drawings affixed to this specification and forming part thereof, apparatus embodying my invention are illustrated diagrammatically by way of example, identical parts being indicated by the same reference numerals in all the figures.

In the drawings—

Figs. 1 and 2 are elevations of the terrestrial globe at different inclinations of its axis showing my apparatus drawn to an exaggerated scale.

Figs. 3 and 4 are diagrammatic sections at right angles to one another illustrating the spherical reflector, one of the fluid-traversed tubes and the collecting lens.

Figure 5:
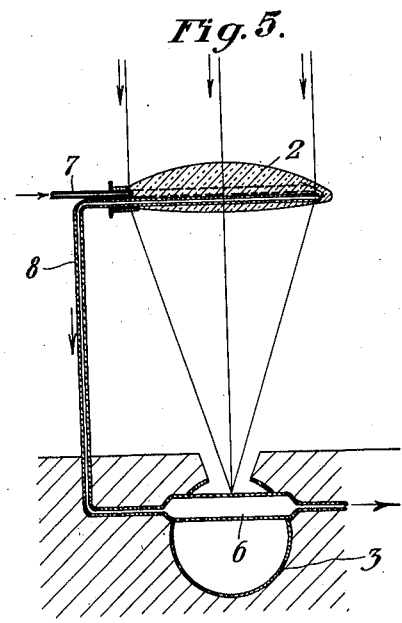
Fig. 5 illustrates a modified construction.

As shown in Figs. 1 to 4, the solar rays are reflected by a plane reflector 1 carried in a support 4 to a lens 2 by which they are collected and conducted into a hollow spherical reflector 3 which may be arranged above ground or under ground. Preferably it is arranged in a concrete structure which is filled with sand, infusorial earth or any other suitable insulating material. The lens 2 is rigidly connected with said hollow spherical reflector 3 and arranged at some distance above ground. On the northern hemisphere it is directed to the south at an angle corresponding to the latitude. With this arrangement it is not necessary to make the large and heavy hollow spherical reflector movable or adjustable. Moreover, it is completely insulated against loss of heat and can be protected against atmospheric influences such as wind, rain, etc., by a wall or a roof. The plane reflector 1 can be adjusted in its support 4.

In the hollow spherical reflector 3 is arranged a tube 6 traversed by the fluid to be heated. The tube 6 is directly heated by the solar rays from the lens 2 and at the same time it is acted upon by the rays reflected by the walls of the spherical reflector 3. To this end the walls of the spherical reflector 3 can be coated with a reflecting, for instance, white layer on the inside. The reflector 3 also prevents loss of heat from the tube 6.

A plurality of spherical reflectors may be arranged beside one another or behind one another, preferably in the direction from east to west at a lateral inclination of some degrees. By these means, it is possible to arrange the tube 6 at an angle as in a tubular boiler and to effect automatic circulation of the liquid or gas to be heated. If water is to be evaporated directly, the tubes 6 of the several spherical reflectors open into a common steam reservoir (not shown) arranged above the spherical reflectors and feed water is supplied from below or at the lowest ends of the tubes 6.

The efficiency of the plant is considerably increased, if the lens 2, as shown in Fig. 5, is utilized for pre-heating the fluid, for instance, feed water. To this end the lens is provided with a channel with inlet and outlet openings for the water supply pipe 7 and the feed pipe 8 which is connected with the lowest point of the tube 6. The water is efficiently preheated by the solar rays in the lens and at the same time the lens is cooled. By these means stresses in the lens and loss of the available solar energy are avoided.

Obviously collecting lenses and cylindrical reflectors may also be used in connection with apparatus in which the object is heated merely by convection.

I wish it to be understood that I do not desire to be limited to the exact details of construction shown and described, for obvious modifications will occur to a person skilled in the art.

I claim:—

1. Solar heater comprising fluid carrying means, a hollow substantially spherical reflector having an aperture therein and surrounding said fluid carrying means so as to concentrate thereon a large proportion of the solar rays entering it through said aperture and optical means for directing solar rays into said reflector.

2. Solar heater comprising fluid carrying means, a hollow substantially spherical reflector having an aperture therein and surrounding said fluid carrying means so as to concentrate thereon a large proportion of the solar rays entering it through said aperture, optical means for directing solar rays into said reflector and means whereby the fluid to be heated is enabled to first traverse said optical means so as to be preheated therein and to exert a cooling effect thereon.

In testimony whereof I affix my signature.

ADOLF MARCUSE.